Patented Dec. 12, 1933

1,938,696

UNITED STATES PATENT OFFICE 1,938,696

MACHINE TOOL

William F. Groene, Cincinnati, Ohio, assignor to The R. K. Le Blond Machine Tool Company, Cincinnati, Ohio, a corporation of Delaware Application November 4, 1932. Serial No. 641,244

16 Claims. (Cl. 82—9)

This invention pertains to tool feeding mechanism for crankshaft lathes and their tools, and is a simplification of the feeding means shown in Patent No. 1,744,885, of January 28, 1930. Certain features illustrated or referred to in this application will be found in the above mentioned patent and in copending applications, Ser. No. 407,814, filed Nov. 18, 1929; Ser. No. 283,712, filed June 7, 1928; and in Patent No. 1,878,130, of Sept. 20, 1932.

One object of the improvement is the provision of simplified means to feed a group of pairs of tools towards the work by a single operating means, each tool of each pair of tools moving in opposite directions to reach the work.

Another object is to provide novel means for controlling the feeding operations of the machine in conjunction with the novel feeding mechanism.

Other objects will appear in the description that will follow:

Figure 1:
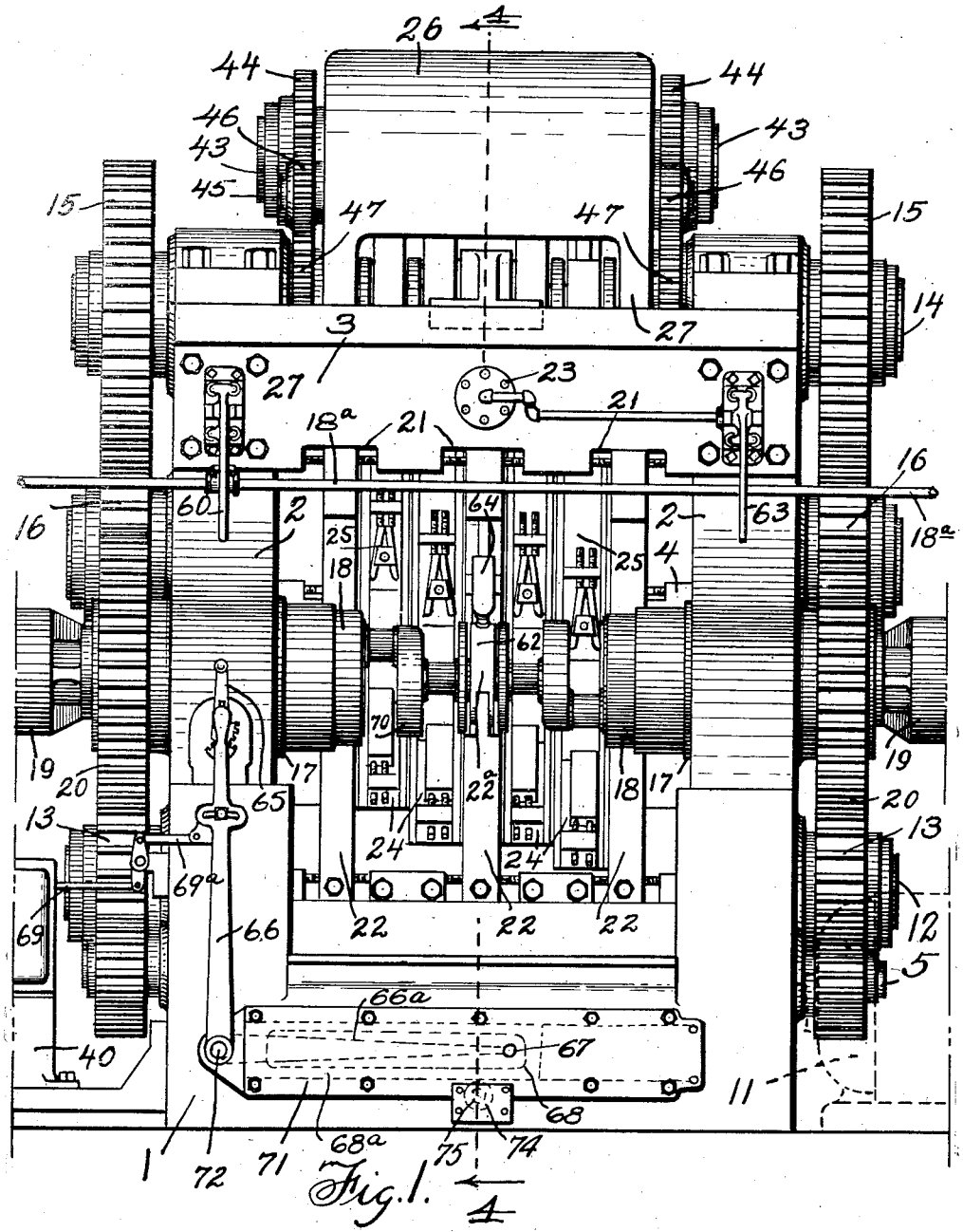
Figure 1 is a front elevation of a crankshaft lathe embodying my invention.

The base of the machine is shown at 1. Mounted on this base 1 are housings 2, these housings being tied together by tie bars, tie bar 3 being at the upper front and tie bar 4, at the rear of the housings 2.

Mounted in a passageway through the bed, is the power shaft 5, extending beyond the bed and having pinion gears 6 fixed on its extreme outer ends. A gear 7 is mounted on shaft 5 inward from pinion 6 at one end. This gear is located in a recess 8 in base 1 along with gear 7 meshing with a gear 9 that meshes with the pinion 10 of a driving motor 11.

Mounted in the base 1 towards the rear is a master crankshaft 12, extending across the machine and through the side walls of the base parts of housings 2, and having on its outer ends gears 13. Mounted in bearings in housings 2, at their top front portion, is a second master crankshaft 14 having its ends extending beyond the bearings and carrying gears 15. Mounted on a stud shaft 15a mounted in housings 2 is an intermediate gear 16, this gear meshing with gears 13 and 15 and causing synchronous rotation of the two master crankshafts 12 and 14. Mounted in bearings 17 is a spindle, carrying chucks 18, these chucks preferably being of the construction shown in our above mentioned Patent 1,878,130, and equipped with power air cylinders 19 as is usual. These chuck spindles have secured to them in driving relationship, outside the housings 2, gears 20, these gears 20 meshing with, and being driven by intermediate gear 16, thus turning any work held by chucks 18, such as an automobile crankshaft, in synchronism with the master crankshafts 12 and 14.

Mounted on the base and engaging slots 21 in the tie bars 3 and 4 are thrust plates 22, preferably similar in construction to those shown in our above mentioned Patent No. 1,744,885, and copending application Ser. No. 407,814. The central one of these thrust plates carries the usual steady rest 22a, which is held in closed relationship around the line bearing of a crankshaft, preferably by mechanism operated by an air cylinder 23, as has been set forth in the copending patent applications heretofore mentioned.

Mounted directly on the wrist 12 of the lower master crank and connected to the upper master crank wrist 14 by respective links 14a are the tool carrying frames 24, these frames being constructed the same in general as those of the above mentioned Patent No. 1,744,885 to oscillate with the master crank wrists 12 and 14 without rocking on lower wrist 13. Each frame consists of a pair of heavy plates, having separators 24a between them and leaving a space in each tool frame for the movements of the lower and upper tool bars 25 and 25a, which are thus mounted for a sliding feeding movement in the tool carrying frames 24.

The feed member 26 has at its front, journals 27 surrounding bearings on master crankshaft 14, so that it may rock thereon. Mounted on base 1 is a bracket 28 having projecting portions 29 forming bearings for a horizontal pin 30. A cylinder 31 has a base 32 forming a bearing surrounding pin 30, allowing the cylinder to swing on pin 30 in a limited front to rear arc. Adapted for movement within cylinder 31 is piston 33 with a rod 33a. The outer upper end of this piston rod 33 has a right hand threaded portion 34, upon which is screwed one end of a turn buckle 35. The feed member 26 has a depending rear central portion 36, bifurcated to form bearings for a pin 37, upon which is mounted a link member 38, having a left handed threaded portion 39 upon which is screwed the other end of turnbuckle 35, thus adjustably connecting piston rod 33a to feed member 26. Cylinder 31 is understood to be connected to the usual hydraulic oil gear pump 40, by piping 41 and 42, partly shown, the operations of the cylinder being controlled by means which will presently be described.

Mounted in bearings at the forward portion of feed member 26 is a feeding master crankshaft 43, this master crankshaft having its ends extending beyond the side walls of feed member 26. Secured in driving relationship on the ends of the master crankshaft 43 are driving gears 44. Carried by bearings in feed member 26 forwardly of the feeding master crankshaft 43 is a shaft 45, extending also beyond the side walls of feed member 26 and carrying gears 46, meshing with the gears 44 on the feeding master crankshaft 43. Fixed on master crankshaft 14, are gears 47, meshing with intermediate gear 46 on shaft 45. Thus gears 47, 46 and 44 form a means for driving feeding master crankshaft 43 from master crankshaft 14, irrespective of the position of feeding master crankshaft 43 as the feed member 26 is moved up or down, for reasons that will appear later.

Each tool frame 24 (Fig. 4) has mounted in bearings in its top rear portion, a short shaft 48, furnishing a bearing for a toothed rocker segment 49, having an arm 50 whose upper end is bifurcated at 51 with bearings 52 in the bifurcated portions. The teeth 53 on rocker segment 49 engage with rack teeth 54 on the rear end portion of the upper tool carrying bar 25a. Inwardly from shaft 48 there is mounted across the tool frames 24 a second short shaft 55 on which is mounted a gear 56, having opposite segments of teeth, one meshing with teeth 54 on the upper tool bar 25a, and the other meshing with teeth 57 on the rear end portion of the lower tool bar 25.

Mounted on each eccentric portion of master crankshaft 43 is a link member 58, the rear end of each link member engaging a pin 59 mounted in the bearing 52, of the bifurcated end portion of the respective segment arm 50. Thus the link members 58 and segment arms 50 form a feeding means for the tool bars 25 and 25a, as will presently be explained.

Figure 2:
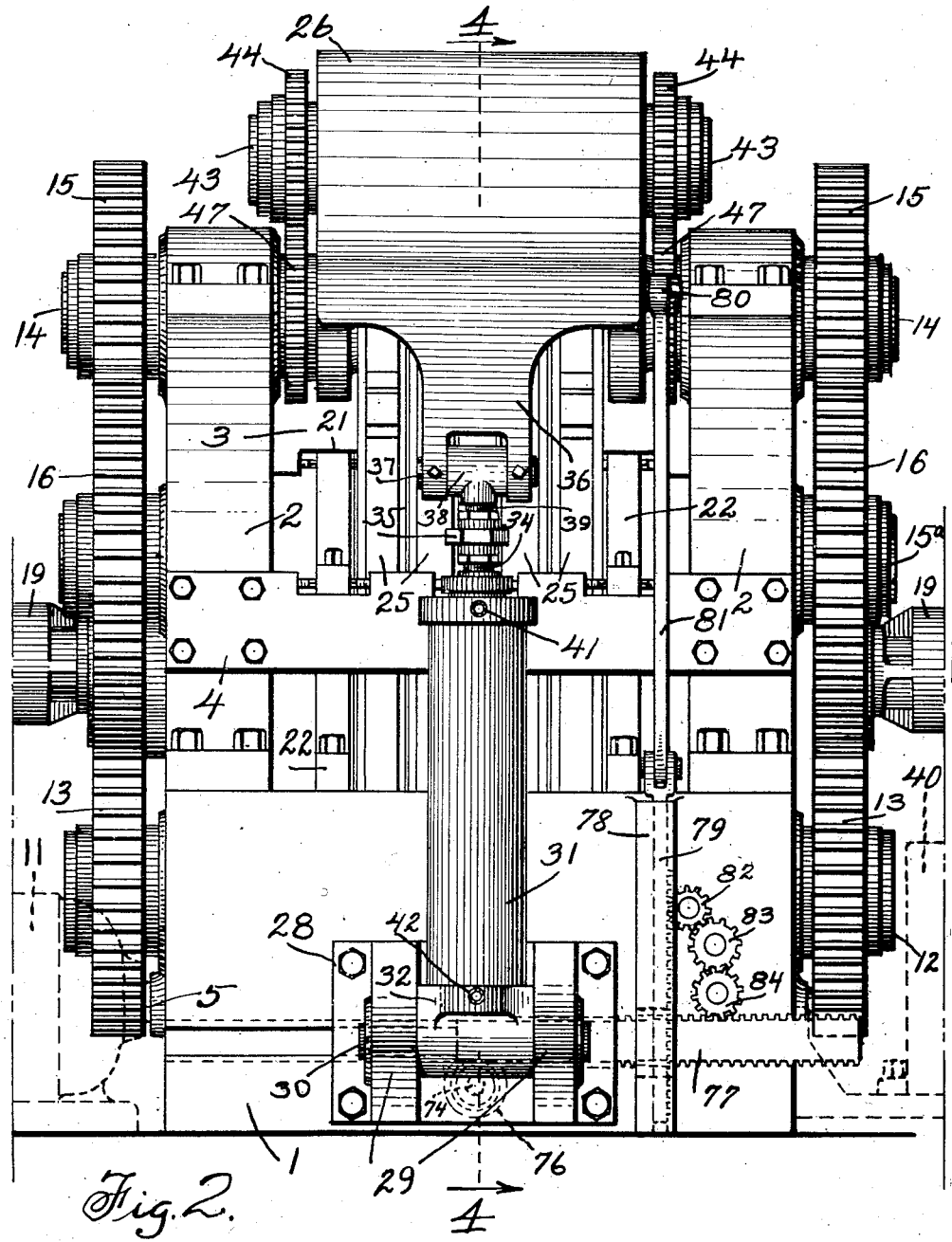
Fig. 2 is a rear elevation of the lathe.
Figure 3:
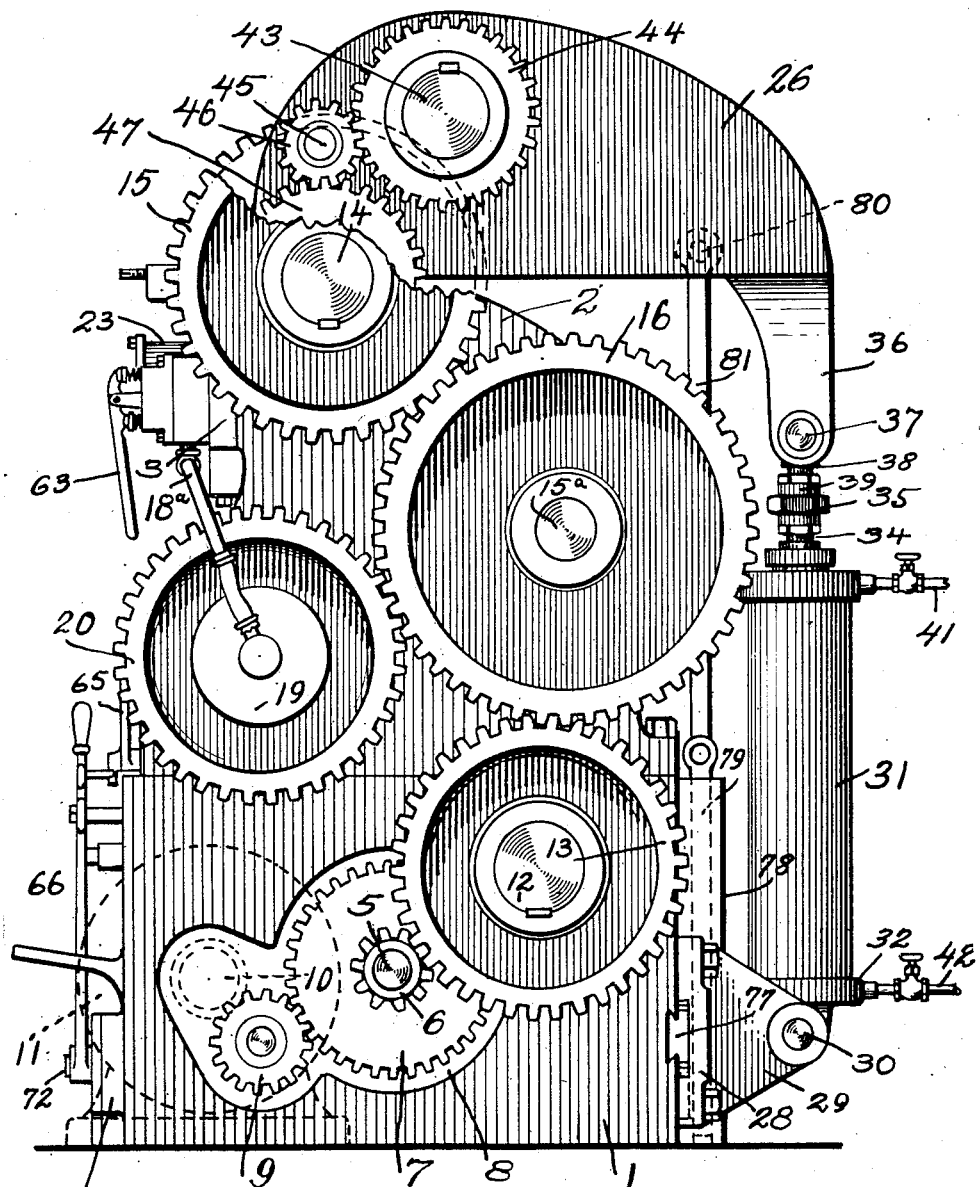
Fig. 3 is an elevation of the power end of the lathe.
Figure 4:
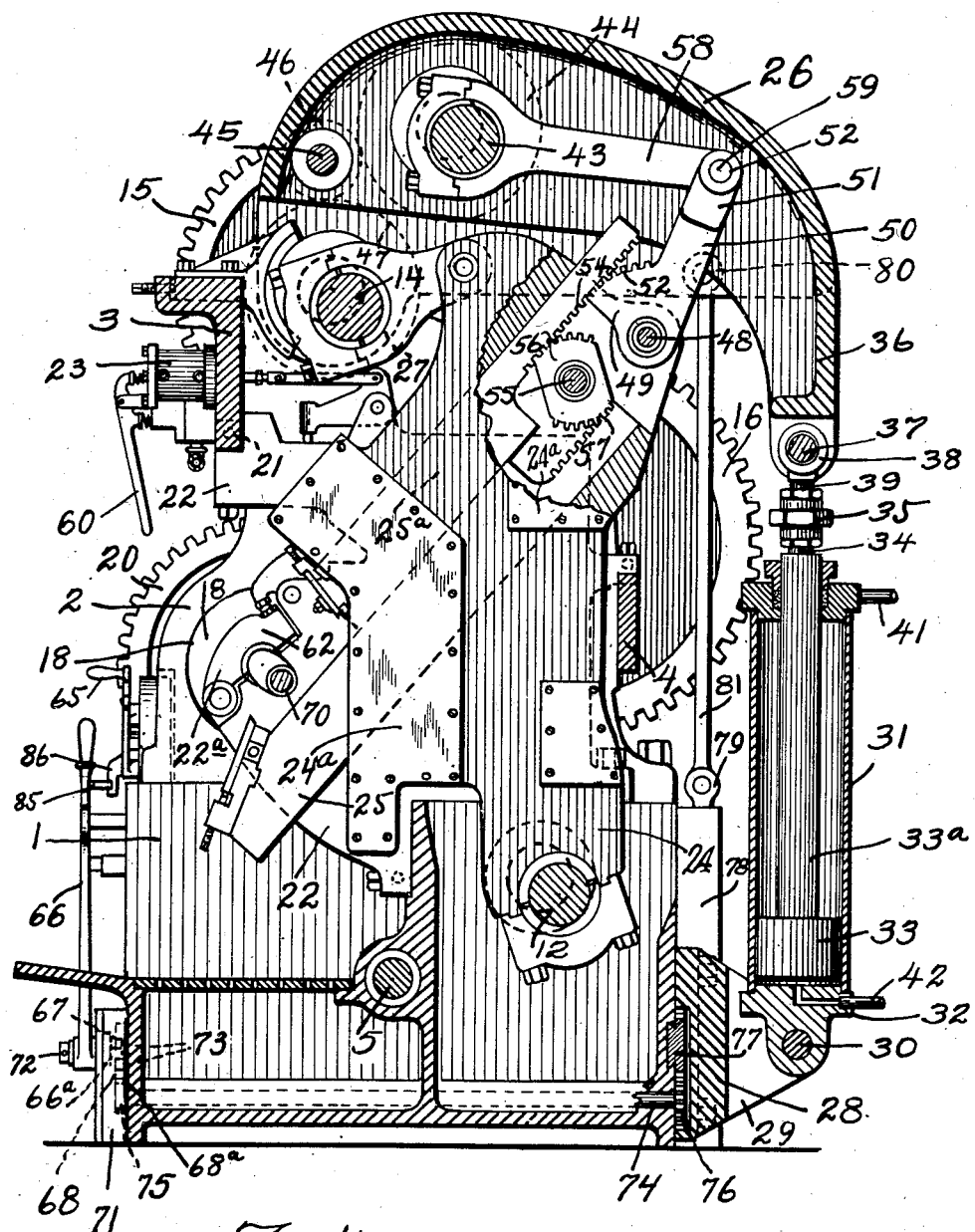
Fig. 4 is a vertical transverse section, the front part being on line 4—4 of Fig. 1, and the rear part of the section being on the line 4—4 of Fig. 2 to show the operating cylinder.

Looking now at Figs. 1, 2 and 4, there are shown control levers and a cam control similar to that illustrated in the above mentioned patents, No. 1,744,885 and No. 1,878,130 and in copending application, Ser. No. 407,814.

When the machine is to be operated, the motor for the oil gear pump 40 is started by throwing a switch on the usual panel board, and thereafter the motor continues to run and the pump to function; the oil under pressure being by-passed in the pump when not being used by the operations of the machine, as is usual.

A crankshaft having been placed in air chucks 18, lever 60 is pulled downward admitting air to the air cylinders 19 of the chucks 18 through piping 18a, and clamping the crankshaft firmly within the chucks. After the crankshaft is clamped in chucks 18, the clamp 62 of steady rest 22a is manually closed, lever 63 is pulled downward and the steady rest clamp held firmly closed by means of the pressure in cylinder 23 operating upon the holding clamp 64, as is fully set forth in copending application, Ser. No. 283,712, heretofore noted.

Power lever 65 is then thrown to the left, thus starting the motor 11 and bringing the lathe into motion. Lever 66 is then pulled to the right, lifting an arm 66a having a pin 67 engaging a slot in the control cam 68, as shown in Fig. 4. At the time lever 65 was moved to the right it also, by means of links 69 and 69a, opens the valve on the oil gear pump admitting pressure to cylinder 31, causing piston 33 to rise, and rock feed member 26 upward, and carrying the feeding master crankshaft 43 to the left (Fig. 4) and causing intermediate gears 46 to roll on gears 47, thus maintaining driving relationship with the master crankshaft 14. As feeding master crankshaft 43 moves to the left, carrying the link members 58 with it, the link members exert a pull on segment arms 50 rocking the toothed segments forward, and by reason of meshing engagement of the segments with the rack teeth 54 on upper tool bars 25a, those bars are fed forward and downward, and also through the engagement of the gear teeth 54 on the upper tool bar with the upper set of teeth of the segmental gears 56, they rock segmental gears 56, which in turn feed the lower tool bars 25 rearward and upward, by reason of the engagement of the lower set of teeth of segmental gears 56 with the rack teeth 57 of lower tool bars 25. Since the three master crankshafts 12, 14, and 43 are driven in synchronism with the chucks 18, the feeding mechanism, tool frames and tool bars all travel in circular orbits in synchronism with the pins of the crankshaft 70 held in the chucks 18. The tools on the upper tool bars 25a will face the cheeks of the webs of crankshaft 70, while the tools on lower tool bars 25 will turn the pins of the crankshaft as the tools approach each other.

The heretofore mentioned Patent No. 1,744,885 and a pending application, Ser. No. 407,814 fully describe the control by the operations cam 68, with the exception that the method of getting the driving power to operations cam 68 is different herein, and will now be described.

The operations cam 68, as shown by dotted lines in Fig. 1, is so designed that there will be such operation of the hydraulic means as to cause a rapid approach of the tools to the work, a coarse feed for the cheeking operation and a fine feed for the pin turning, all as has been done heretofore in the previous cases mentioned.

This operations cam 68 is mounted at the front of the base 1, in a housing 71, the lever 66 having its shaft 72 projecting through the housing and having arm 66a secured thereto, this arm having pin 67 projecting into a slot 73 in the control cam plate and adapted to track therein. On the lower edge of the control cam plate 68 is cut a series of rack teeth 68a. Extending rearwardly in the base 1 is a shaft 74 having secured on its front end a gear 75, meshing with the rack teeth 68a on the bottom of the cam plate 68. The shaft 74 has fixed on its rear end a second gear 76 engaging a series of rack teeth on the lower edge of a sliding bar 77. This bar 77 has a sliding dovetail engagement with a horizontal guideway cut longitudinally in the rear of base 1. The top edge of sliding bar 77 also has a series of rack teeth thereon.

Cast on the base 1 is a vertical guide rib 78, notched to permit transverse movement of sliding bar 77, and mounted in a groove in one side of guide rib 78 is a rack bar 79, having a bifurcated upper end. Secured to feed member 26 is a bearing pin 80, upon which is articularly mounted a link 81, having its lower end pivoted in the upper bifurcated end of rack bar 79. Mounted on the base 1 is a train of gears 82, 83 and 84, the gear 82 meshing with the rack 79 and gear 84 meshing with the gear teeth on the top of sliding bar 77, gear 83 being the intermediate gear.

As the feed member 26 rises under the influence of piston 33, it carries the link 81 with it, causing rack 79 to motivate the gear train 82, 83, 84, and thus cause sliding bar 77 to move in one direction, turning shaft 77 through the medium of gear 72 and causing gear 75 to move the control cam plate 68 in the opposite direction. As the control cam plate 68 travels, the pin 67 follows the configurations of the cam slot 73 moving lever 66, and, through the link 69, the control valve of the oil-gear pump, causing the piston 31 to furnish the various degrees of feed previously noted. When the piston reaches its limit of travel for the feed, the pin 67 drops to the lower slot in the control cam plate throwing lever 66, thus moving the valve on the oilgear pump and reversing the flow of oil to cylinder 31 and retracting the tools. By the further movement of operations cam 68 lever 66 is thrown to neutral, a projection 85 on lever 66 striking a lug 86 on power control lever 65, shutting off motor 11 and stopping the lathe.

The valve levers 60 and 63 are then operated, releasing the chucks 18 and steady rest 62, respectively, and the completed crankshaft is ready for removal from the lathe.

By the mechanisms of the lathe herein described, it is possible, from a single power source, to feed any number of pairs of cutting tools in an accurate and efficient manner, while each individual pair of tools is traveling in an orbit eccentric to the axial line of the work.

Having thus described my invention, what I claim as new and desire to secure by Letters Patent, is:—

1. In a machine tool of the character described, a rotary work holder, a tool frame, rotary means oscillating the tool frame in synchronism with the rotation of the work holder, a tool having a feeding movement on the tool frame relative to the work holder, a feeding member rocking on the axis of rotation of said tool-frame-oscillating means, and means operatively connecting said feeding member to said tool, comprising a pivotal connection to said feeding member, oscillating on and relatively to said feeding member in synchronism with the tool frame oscillation.

2. In a machine tool of the character described, a rotary work holder, a series of tool frames arranged along the work holder axis, rotary means oscillating the tool frames in synchronism with the rotation of the work holder, tools having feeding movements on the tool frames relative to the work holder, a feeding member rocking on the axis of rotation of said tool-frame-oscillating means, and means operatively connecting said feeding member to the respective tools, comprising pivotal connections to said feeding member, oscillating on and relatively to said feeding member in synchronism with the tool frame oscillation.

3. In a machine tool of the character described, a rotary work holder, a series of tool frames arranged along the work holder axis, rotary means oscillating the tool frames in synchronism with the rotation of the work holder, tools having feeding movements on the tool frames relative to the work holder, a feeding member rocking on the axis of rotation of said tool-frame-oscillating means, fluid-pressure-actuated means rocking said feeding member, and means operatively connecting said feeding member to the respective tools, comprising pivotal connections to said feeding member, oscillating on and relatively to said feeding member in synchronism with the tool frame oscillation.

4. In a machine tool of the character described, a rotary work holder, a tool frame, rotary means oscillating the tool frame in synchronism with the rotation of the work holder, a tool having a feeding movement on the tool frame relative to the work holder, a feeding member rocking on the axis of rotation of said tool-frame-oscillating means, fluid-pressure-actuated means rocking said feeding member, means operatively connecting said feeding member to said tool, comprising a pivotal connection on said feeding member, oscillating on said feeding member in synchronism with the tool frame oscillation, and means actuated by the rocking of said feeding member to control operation of said fluid-pressure-actuated means.

5. In a machine tool of the character described, a rotary work holder, a tool frame, rotary means oscillating the tool frame in synchronism with the rotation of the work holder, a tool having a feeding movement on the tool frame relative to the work holder, a feeding member rocking on the axis of rotation of said tool-frame-oscillating means, a lever operatively related to said tool, a link connected to said lever, and a pivotal connection connecting said link to said feeding member oscillating on and relatively to said feeding member in synchronism with the tool frame oscillation.

6. In a machine tool of the character described, a rotary work holder, a tool frame, rotary means oscillating the tool frame in synchronism with the rotation of the work holder, a tool having a feeding movement on the tool frame relative to the work holder, a feeding member rocking on the axis of rotation of said tool-frame-oscillating means, a rack connected to said tool, a gear member meshing with said rack, a lever connected to said gear member, a link connected to said lever, and a pivotal connection connecting said link to said feeding member oscillating on and relatively to said feeding member in synchronism with the tool frame oscillation.

7. In a machine tool of the character described, a rotary work holder, a tool frame, rotary means oscillating the tool frame in synchronism with the rotation of the work holder, tools having inverse feeding movements on the tool frame relative to the work holder, a feeding member rocking on the axis of rotation of said tool-frame-oscillating means, and means operatively connecting said feeding member to said tools, comprising a pivotal connection to said feeding member, oscillating on and relatively to said feeding member in synchronism with the tool frame oscillation.

8. In a machine tool of the character described, a rotary work holder, a tool frame, rotary means oscillating the tool frame in synchronism with the rotation of the work holder, tools having inverse feeding movements on the tool frame relative to the work holder, a feeding member rocking on the axis of rotation of said tool-frame-oscillating means, racks connected to the respective tools, a gear member meshing with said racks, an additional gear member meshing with one of said racks, a lever connected to said additional gear member, a link connected to said lever, and a pivotal connection connecting said link to said feeding member, oscillating on said feeding member in synchronism with the tool frame oscillation.

9. In a machine tool of the character described, a rotary work holder, a tool frame, rotary means oscillating the tool frame in synchronism with the rotation of the work holder, a tool having a feeding movement on the tool frame relative to the work holder, a feeding member rocking on the axis of rotation of said tool-frame-oscillating means, fluid-pressure-actuated means rocking said feeding member, a cam sliding to control operation of said fluid-pressure-actuated means, a rack on said cam, gear means meshing with said rack, and means whereby rocking of said feeding member rotates said gear means.

10. In a machine tool of the character described, a rotary work holder at the front of the machine, a tool frame at the rear of said work holder, rotary means at the front upper part of said machine oscillating the tool frame in synchronism with the rotation of the work holder, a tool having a feeding movement on the tool frame relative to the work holder, a feeding member rocking on the axis of rotation of said tool-frame-oscillating means and extending toward the rear of said machine, fluid-pressure-actuated means at the rear of said machine, operatively connected to the rear end part of said feeding member to rock said feeding member, and means intermediate of the front and rear ends of said feeding member operatively connecting said feeding member to said tool, comprising a pivotal connection to said feeding member, oscillating on said feeding member in synchronism with the tool frame oscillation.

11. In a machine tool of the character described, a rotary work holder at the front of the machine, a tool frame at the rear of said work holder, rotary means at the front upper part of said machine oscillating the tool frame in synchronism with the rotation of the work holder, a tool having a feeding movement on the tool frame relative to the work holder, a feeding member rocking on the axis of rotation of said tool-frame-oscillating means and extending toward the rear of said machine, fluid-pressure-actuated means at the rear of said machine, operatively connected to the rear end part of said feeding member to rock said feeding member, means intermediate of the front and rear ends of said feeding member operatively connecting said feeding member to said tool, comprising a pivotal connection to said feeding member, oscillating on said feeding member in synchronism with the tool frame oscillation, a cam at the lower front part of said machine sliding to control operation of said fluid-pressure-actuated means, a rack on said cam, racks sliding on the lower rear part of said machine, gear means operatively connecting the cam rack to one of the rear racks, gear means operatively connecting the rear racks together, and a rod pivoted to the other rear rack and to the rear part of said feeding member.

12. In a machine for turning a crank pin on a crank shaft, a rotary holder rotating the crank shaft on the axis of its line bearings, a tool frame, a tool having a feeding movement on said tool frame toward the crank pin, means to oscillate said tool frame in synchronism with the rotation of the crank shaft, a feeding member mounted independently of the tool frame and movable at variance with the oscillation of the tool frame, and an operative connection from the feeding member to the tool, oscillating relatively to but in synchronism with the tool frames to impart correct feeding movement of the tool toward the crank pin.

13. In a machine for turning a crank pin on a crank shaft, a rotary holder rotating the crank shaft on the axis of its line bearings, master cranks rotating in synchronism with the crank shaft, a tool frame carried by the crank pin of one master crank, a feeding member rocking coaxially with the rotation of said one master crank, the other master crank rotating in said feeding member, a tool having a feeding movement on said tool frame toward the crank shaft crank pin, and a device operatively connected to said tool and to the crank pin of said other master crank, imparting the feeding movement to the tool.

14. In a machine for turning a crank pin on a crank shaft, a rotary holder rotating the crank shaft on the axis of its line bearings, a master crank rotating in synchronism with the crank shaft, a tool frame carried by the crank pin of said master crank, a feeding member rocking coaxially with the rotation of said master crank, a second master crank rotatable on said feeding member, gears rotating with the respective master shafts and operatively connected in planetary relation, whereby said master cranks rotate in synchronism, a tool having a feeding movement on said tool frame toward the crank shaft crank pin, and a device operatively connected to said tool and to the crank pin of said second master crank, imparting the feeding movement to the tool.

15. In a machine for turning crank pins on a crank shaft, a rotary holder rotating the crank shaft on the axis of its line bearings, a series of tool frames and tools having feeding movements on the respective tool frames toward the respective crank pins, means to oscillate the tool frames in synchronism with the travel of the respective crank pins, a feeding member mounted independently of the tool frame and movable at variance with the oscillation of the tool frames, and operative connections from the feeding member to the respective tools oscillating relatively to but in synchronism with the respective tool frames, to impart correct feeding movement of the tools toward the respective crank pins.

16. In a machine for turning crank pins on a crank shaft, a rotary holder rotating the crank shaft on the axis of its line bearings, a series of tool frames and tools having feeding movements on the respective tool frames toward the respective crank pins, means rotated to oscillate the tool frames in synchronism with the travel of the respective crank pins, a feeding member rocking on the center of rotation of the tool-frame-oscillating means, and means rotated by said tool-frame-oscillating means to oscillate on said feeding member in synchronism with the tool frame oscillation and connected to the respective tools, to impart correct feeding movement of the tools toward the respective crank pins.

WILLIAM F. GROENE.